US012033022B2

(12) United States Patent
Murayama et al.

(10) Patent No.: US 12,033,022 B2
(45) Date of Patent: Jul. 9, 2024

(54) RFID AUXILIARY ANTENNA DEVICE

(71) Applicant: Murata Manufacturing Co., Ltd., Nagaokakyo (JP)

(72) Inventors: Hiromi Murayama, Nagaokakyo (JP); Noboru Kato, Nagaokakyo (JP); Yoichi Saito, Nagaokakyo (JP); Noriyuki Ueki, Nagaokakyo (JP); Makoto Yasutake, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 210 days.

(21) Appl. No.: 17/742,950

(22) Filed: May 12, 2022

(65) Prior Publication Data
US 2022/0269872 A1    Aug. 25, 2022

Related U.S. Application Data

(63) Continuation of application No. PCT/JP2021/002171, filed on Jan. 22, 2021.

(30) Foreign Application Priority Data

Apr. 27, 2020  (JP) ................................. 2020-078510

(51) Int. Cl.
*H01Q 1/22* (2006.01)
*G06K 7/10* (2006.01)
(Continued)

(52) U.S. Cl.
CPC ... *G06K 7/10316* (2013.01); *G06K 19/07773* (2013.01); *H01Q 1/2208* (2013.01); *H01Q 7/00* (2013.01)

(58) Field of Classification Search
CPC ...... H01Q 1/2208; H01Q 1/2216; H01Q 7/00; G06K 7/10316; G06K 7/10178; G06K 19/07773
See application file for complete search history.

(56) References Cited

U.S. PATENT DOCUMENTS

2003/0234704 A1\* 12/2003 Hidaka .................. H01P 7/082
                                                              333/202
2012/0206239 A1    8/2012 Ikemoto

FOREIGN PATENT DOCUMENTS

JP          3047027 U      3/1998
JP       2000049512 A      2/2000
(Continued)

OTHER PUBLICATIONS

International Search Report issued for PCT/JP2021/002171, date of mailing Apr. 27, 2021.

*Primary Examiner* — Hoang V Nguyen
(74) *Attorney, Agent, or Firm* — ArentFox Schiff LLP

(57) ABSTRACT

An RFID auxiliary antenna device is provided on an article that is adjacent to an RFID tag to be communicated or accommodates the RFID tag. The RFID auxiliary antenna device includes a conductive pattern that circles the article. A capacitance component generated between conductive patterns and an inductance component of the conductive pattern configure a resonant circuit. A resonant frequency of the resonant circuit is equal to or substantially equal to a communication frequency of the RFID tag, and the RFID auxiliary antenna device is magnetically coupled to each of the RFID tag and a reader/writer.

15 Claims, 15 Drawing Sheets

(51) Int. Cl.
*G06K 19/077* (2006.01)
*H01Q 7/00* (2006.01)

(56) References Cited

FOREIGN PATENT DOCUMENTS

| | | |
|---|---|---|
| JP | 2003179526 A | 6/2003 |
| JP | 2004221623 A | 8/2004 |
| JP | 2006188282 A | 7/2006 |
| WO | 2011118379 A1 | 9/2011 |

* cited by examiner

104

105

RFID AUXILIARY ANTENNA DEVICE

CROSS REFERENCE TO RELATED APPLICATIONS

The present application is a continuation of PCT/JP2021/002171 filed Jan. 22, 2021, which claims priority to Japanese Patent Application No. 2020-078510, filed Apr. 27, 2020, the entire contents of each of which are incorporated herein by reference.

TECHNICAL FIELD

The present disclosure relates to an RFID auxiliary antenna device used to assist in communication with an RFID tag.

BACKGROUND

International Publication No. 2011/118379 (hereinafter "Patent Literature 1") discloses a small RFID tag including a magnetic field antenna.

In this example of Patent Literature 1, an antenna used in an RFID system includes an electric field antenna and a magnetic field antenna. The electric field antenna, while increasing a communication distance, planarly provides an antenna pattern having a length of a ½ wavelength of a communication frequency, in a case of the electric field antenna such as a dipole antenna, for example. In contrast, the magnetic field antenna is able to be basically configured simply by forming a coil-like antenna, and thus is able to be more easily reduced in size than the electric field antenna.

On the other hand, an RFID tag including a magnetic field antenna has a shorter communicable distance and a smaller communication area than an RFID tag including an electric field antenna.

SUMMARY OF THE INVENTION

In view of the foregoing, exemplary embodiments of the present disclosure are directed to provide an RFID auxiliary antenna device that increases a substantial communication area between an RFID tag and a reader/writer of the RFID tag.

In an exemplary embodiment, an RFID auxiliary antenna device can be provided on an article that is adjacent to an RFID tag to be communicated or accommodates the RFID tag. In this aspect, the RFID auxiliary antenna device includes a conductive pattern that circles the article. Moreover, a capacitance component generated between conductive patterns and an inductance component of the conductive pattern configure a resonant circuit that has a resonant frequency that is equal to or substantially equal to a communication frequency of the RFID tag.

According to the above configuration, the resonant circuit configured by the capacitance component generated between the conductive patterns and the inductance component of the conductive pattern functions as the auxiliary antenna device to be coupled to each of an antenna of the RFID and an antenna of a reader/writer, which improves communication performance between the RFID tag and the reader/writer.

According to the exemplary embodiment of the present disclosure, an RFID system is configured in which a substantial communication area between an RFID tag and a reader/writer of the RFID tag is increased. In addition, compared with similar communication areas, the RFID tag is also reduced in size.

DETAILED DESCRIPTION OF EXEMPLARY EMBODIMENTS

First Exemplary Embodiment

Figure 1A:
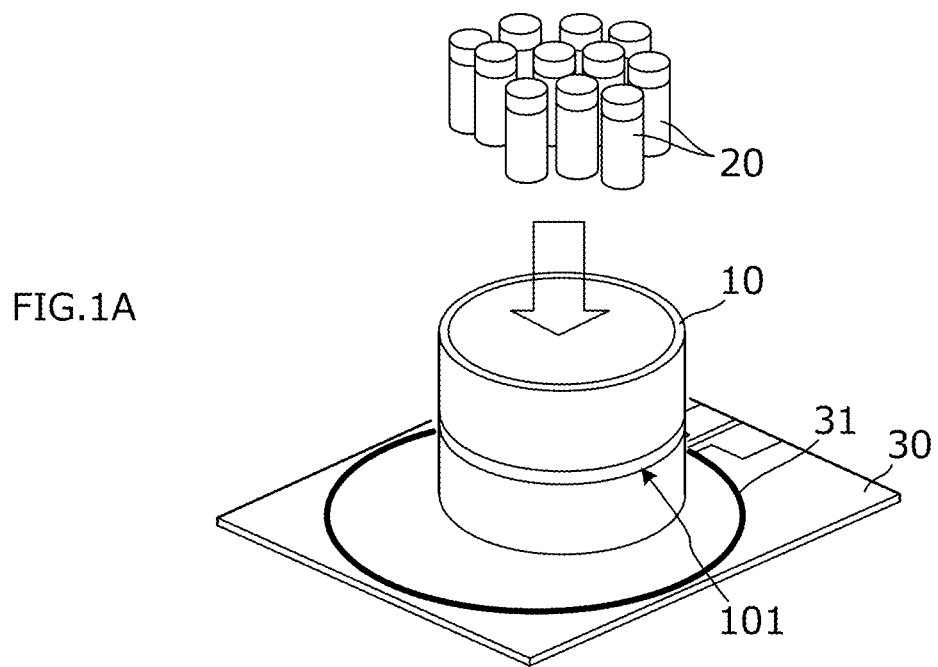
FIG. 1A is a perspective view showing a configuration including an RFID auxiliary antenna device 101 according to a first exemplary embodiment, an article 10 including the RFID auxiliary antenna device 101, an RFID tagged article 20, and an antenna substrate 30.
Figure 1B:
FIG. 1B is a perspective view showing a back side of the RFID tagged article 20.

FIG. 1A is a perspective view showing a configuration including an RFID auxiliary antenna device 101 according to a first exemplary embodiment, an article 10 including the RFID auxiliary antenna device 101, an RFID tagged article 20, and an antenna substrate 30. FIG. 1B is a perspective view showing a back side of the RFID tagged article 20.

As shown in FIG. 1B, an RFID tag 21 is adhered or otherwise secured to the RFID tagged article 20. As shown in FIG. 1A, the article 10 is a bottomed cylindrical container and is a molded body of an insulating resin. A plurality of RFID tagged articles 20 are accommodated in this article 10. The RFID auxiliary antenna device 101 is provided on the article 10 so as to circle an outer side surface (e.g., a perimeter or circumference) of the article 10. This RFID auxiliary antenna device 101 is not connected to a certain external circuit, and is independent by itself in the exemplary aspect.

As shown in FIG. 1A, a reader/writer antenna 31 by a loop antenna is provided on the antenna substrate 30. The reader/writer antenna 31 is connected to a reader/writer (not illustrated). The reader/writer reads and writes in each RFID tag 21 in a state in which the article 10 that accommodates the RFID tagged article 20 is placed on the antenna substrate 30.

The RFID auxiliary antenna device 101 is coupled to an antenna of the RFID tag 21 and the reader/writer antenna 31. Such a configuration assists communication between the RFID tag 21 and the reader/writer.

Figure 2A:
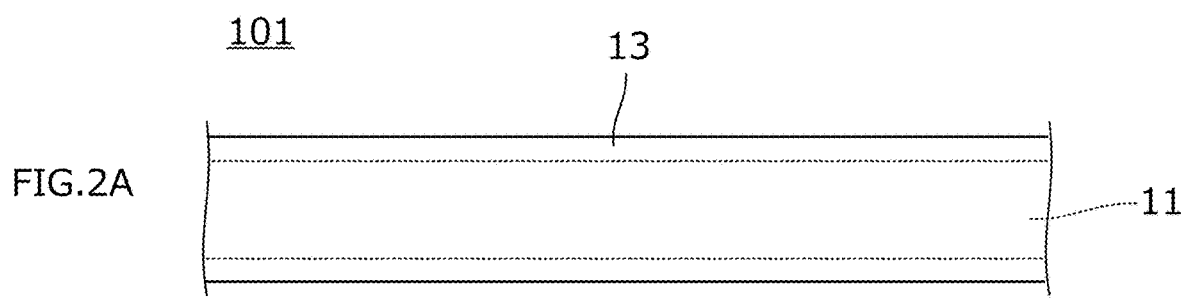
FIG. 2A is a partial plan view of the RFID auxiliary antenna device 101.
Figure 2B:
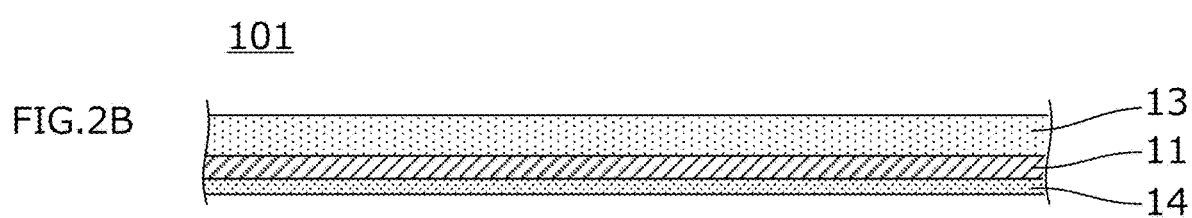
FIG. 2B is a partial cross-sectional view of the RFID auxiliary antenna device 101.

FIG. 2A is a partial plan view of the RFID auxiliary antenna device 101, and FIG. 2B is a partial cross-sectional view of the RFID auxiliary antenna device 101. As shown, the RFID auxiliary antenna device 101 includes a conductive pattern 11 made of metal foil adhered to a base material 13 of insulation. In the present exemplary embodiment, this conductive pattern 11 is a simple stripline-like pattern with a width smaller than a width of the base material 13. An adhesive layer (e.g., a layer of a pressure-sensitive adhesive) 14 is provided on a surface of the base material 13 on which the conductive pattern 11 is provided. In an exemplary aspect, the base material 13 is a resin sheet made of PET (polyethylene terephthalate), PI (polyimide), or the like, and the conductive pattern 11 is obtained by patterning the metal foil such as aluminum foil or Cu foil.

Figure 3A:
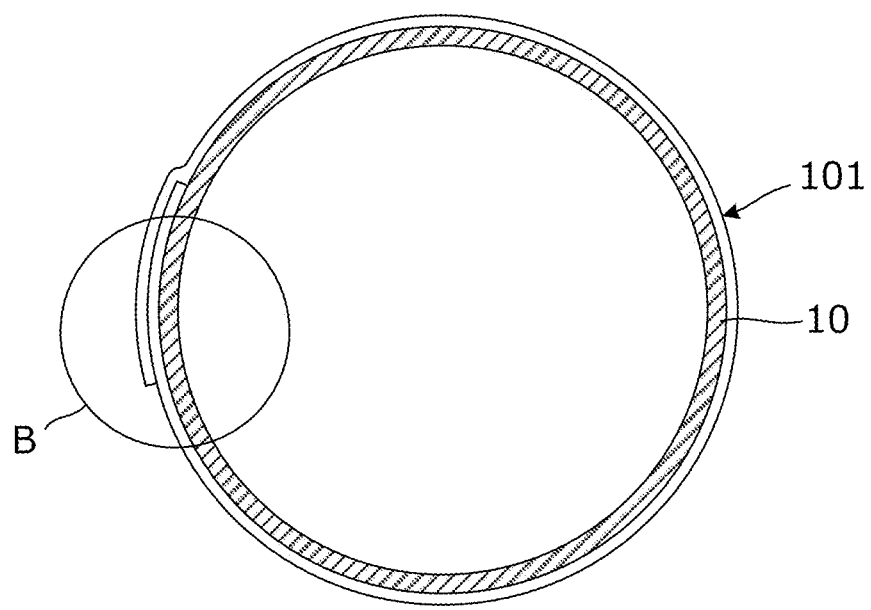
FIG. 3A is a horizontal cross-sectional view of the article 10 and the RFID auxiliary antenna device 101 attached to the article 10.
Figure 3B:
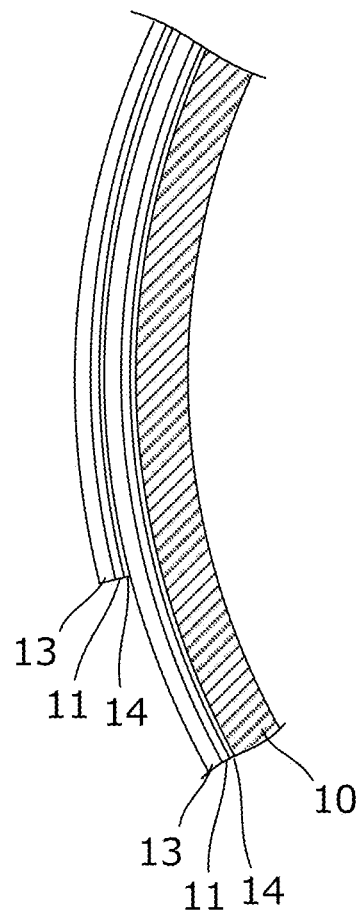
FIG. 3B is an enlarged cross-sectional view of a portion surrounded by a circle B in FIG. 3A.

FIG. 3A is a horizontal cross-sectional view of the article 10 and the RFID auxiliary antenna device 101 attached to the article 10. The inside of the article 10 is in an empty state. FIG. 3B is an enlarged cross-sectional view of a portion surrounded by a circle B in FIG. 3A. The RFID auxiliary antenna device 101 is adhered through the adhesive layer 14 so as to circle an outer side surface of the article 10, which can have a cylindrical shape in an exemplary aspect. A first end and a second end of the stripline-like conductive pattern 11 overlap with each other. A first capacitance component is generated between conductive patterns 11 that face each other in a stacking direction through the base material 13. A length in a direction in which this overlapping portion circles is a length by which the first capacitance component functions as a capacitance of a resonant circuit. For example, the length is ½ or less of the entire periphery of the conductive pattern 11.

Figure 4:
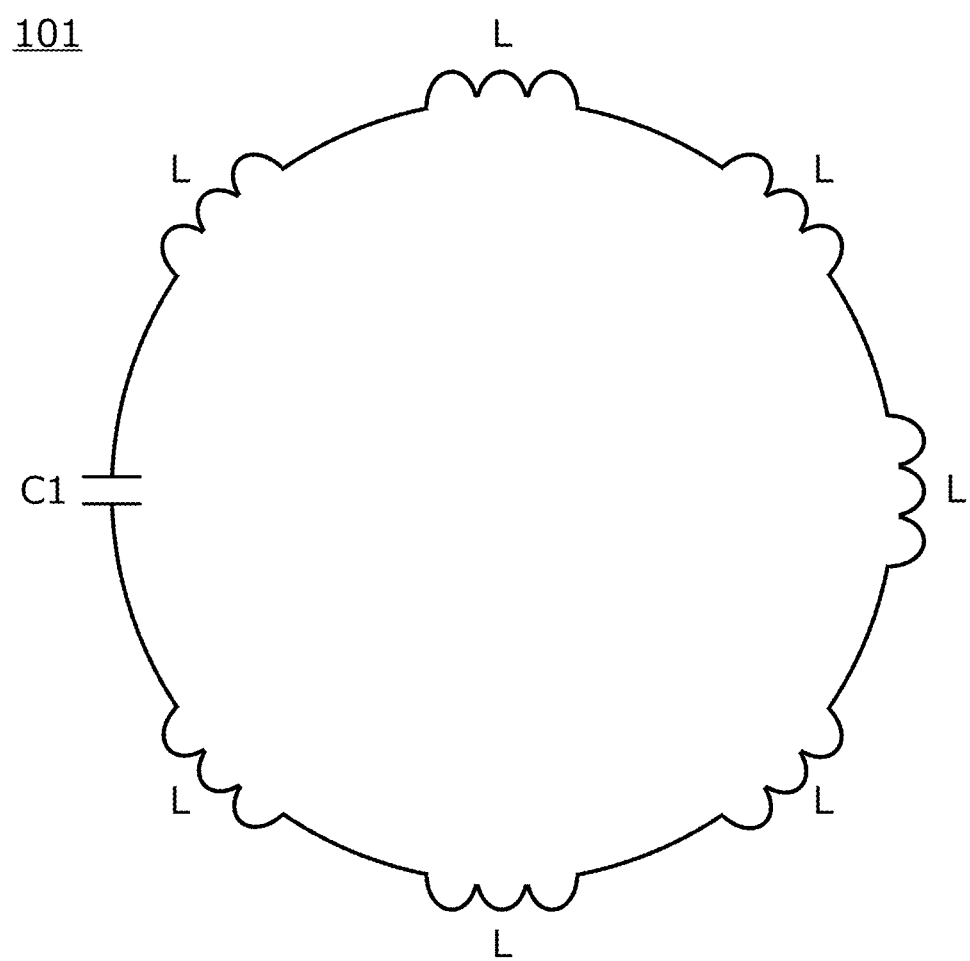
FIG. 4 is an equivalent circuit diagram of the RFID auxiliary antenna device 101.

FIG. 4 is an equivalent circuit diagram of the RFID auxiliary antenna device 101. In FIG. 4, a capacitor C1 is equivalent to the first capacitance component generated between the first end and second end of the conductive pattern 11. An inductor L is equivalent to an inductance component of the conductive pattern 11. The capacitor C1 and the inductor L configure an LC resonant circuit. The capacitance of the capacitor C1 is 2 pF, for example, and the total inductance of the inductor L is 15 nH, for example.

In the exemplary aspect, a resonant frequency of the resonant circuit is equal to a communication frequency of the RFID tag 21, or is substantially equal to the communication frequency. For example, when the RFID tag is a RFID tag in a 900-MHz band, the resonant circuit resonates in the 900-MHz band. The resonant frequency of the RFID auxiliary antenna device 101 can also be a frequency at which the antenna of the RFID tag 21 and the reader/writer antenna 31 are magnetically coupled to each other. The conductive pattern 11 not only simply uses the inductance, but also forms a circular loop shape by circling along the outer perimeter of the article 10.

Figure 5:
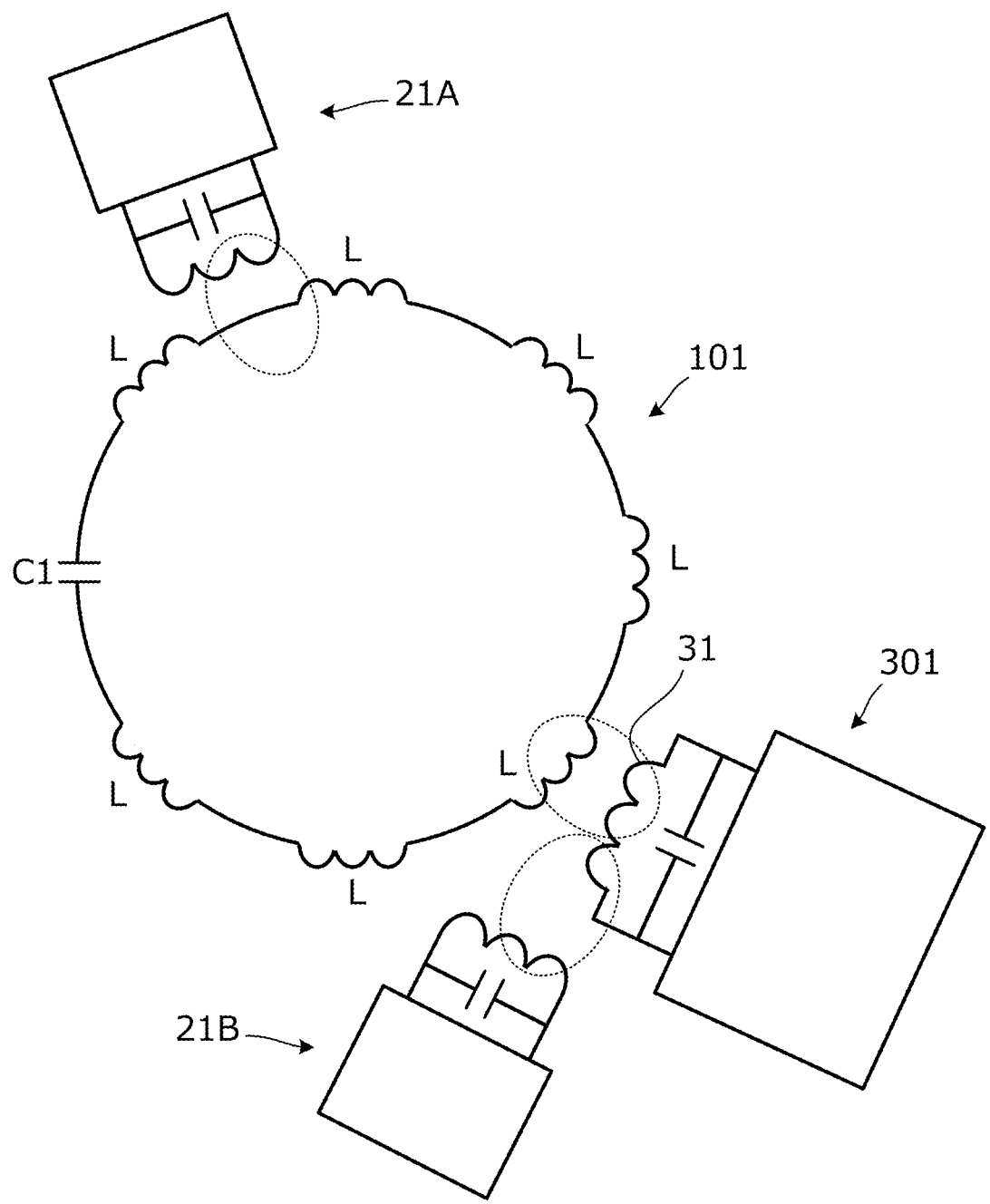
FIG. 5 is a view showing a coupling relationship between RFID tags 21A and 21B, the RFID auxiliary antenna device 101, and a reader/writer 301.

FIG. 5 is a view showing a coupling relationship between RFID tags 21A and 21B, the RFID auxiliary antenna device 101, and a reader/writer 301. The RFID tags 21A and 21B are two of a plurality of RFID tags 21, as described above with respect to FIG. 1. In this example, a magnetic field antenna of the RFID tag 21A and a loop by the conductive pattern 11 are magnetically coupled to each other. In addition, the RFID auxiliary antenna device 101 and the reader/writer antenna 31 of the reader/writer 301 are magnetically coupled to each other. Furthermore, a magnetic field antenna of the RFID tag 21B and the reader/writer antenna 31 are magnetically coupled to each other.

According to the above configuration, the resonant circuit configured by the first capacitance component generated between the conductive patterns 11 and the inductance component of the conductive pattern 11 functions as a resonant circuit to be coupled to the antenna of the RFID tag 21 and also as a resonant circuit to be coupled to the reader/writer antenna 31 of the reader/writer 301. As a result, the RFID auxiliary antenna device 101 is configured as an auxiliary antenna device that performs relay between the RFID tag 21 and the reader/writer 301. In addition, the RFID auxiliary antenna device 101 can also function as an antenna for a booster of the RFID tag 21 or the reader/writer 301.

It is also noted that in FIG. 5, as shown in coupling between the RFID tag 21B and the reader/writer antenna 31, the RFID auxiliary antenna device 101 does not block direct coupling between the RFID tag 21 and the reader/writer antenna 31.

According to the present exemplary embodiment, an RFID system in which a substantial communication area between the RFID tag 21 and the reader/writer 301 of the RFID tag 21 is increased is configured. In addition, a predetermined communication area is secured by the function of the RFID auxiliary antenna device 101 even when the antenna of the RFID tag is reduced in size, so that, compared with similar communication areas, the RFID tag is further reduced in size.

Figure 6:
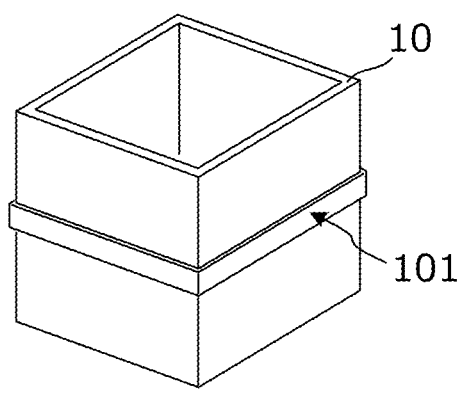
FIG. 6 is a perspective view of another auxiliary antenna device according to the first exemplary embodiment.

It is noted that while FIG. 1A, FIG. 3A, and other drawings show an example in which the article 10 as a container to accommodate the RFID tag is a bottomed cylindrical container, the shape of the article 10 is not limited to such a shape. For example, FIG. 6 is a perspective view of the article 10 including another RFID auxiliary antenna device 101 according to the present exemplary embodiment. In this example, the RFID auxiliary antenna device 101 is adhered to a side surface of the article 10 having a rectangular parallelepiped shape.

Accordingly, it is noted that the shape of the article 10 is not limited to a circular cylindrical shape or a rectangular cylindrical shape, and can be any shape in which the RFID auxiliary antenna device configures a loop antenna as described above.

In addition, the RFID auxiliary antenna device 101 can be provided on not only a container that accommodates the RFID tag to be communicated, but also an article adjacent to the RFID tag. For example, the RFID auxiliary antenna device 101 can be provided on the side surface of a bottomless article having a circular cylindrical shape or a rectangular cylindrical shape, and an article with this RFID auxiliary antenna device 101 may be disposed near the RFID tag.

Second Exemplary Embodiment

In a second exemplary embodiment, an RFID auxiliary antenna device 102 in which a conductive pattern is provided on a plurality of layers will be described.

Figure 7A:
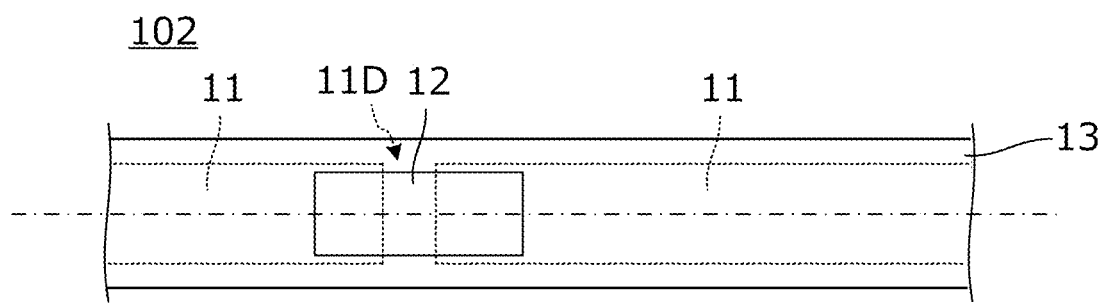
FIG. 7A is a partial plan view of an RFID auxiliary antenna device 102 according to a second exemplary embodiment.
Figure 7B:
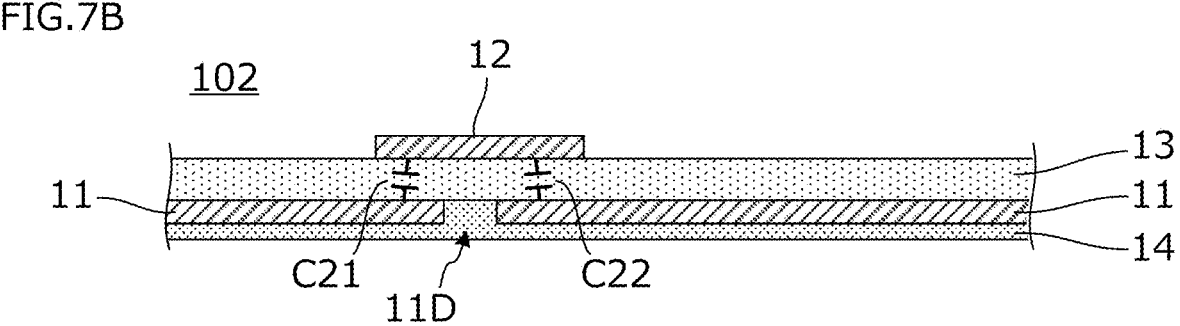
FIG. 7B is a partial cross-sectional view of the RFID auxiliary antenna device 102 in a dashed line portion in FIG. 7A.

FIG. 7A is a partial plan view of an RFID auxiliary antenna device 102 according to the second exemplary embodiment, and FIG. 7B is a partial cross-sectional view of the RFID auxiliary antenna device 102 in a dashed line portion in FIG. 7A. As shown, this RFID auxiliary antenna device 102 includes a conductive pattern 11 made of metal foil adhered to a bottom surface of the base material 13 of insulation, and a conductive pattern 12 made of metal foil adhered to a top surface of the base material 13. The conductive pattern 11 is a stripline-like pattern with a width smaller than the width of the base material 13, and includes a discontinuous portion 11D in an intermediate portion of the pattern. Moreover, the conductive pattern 12, in a plan view of the conductive pattern 11, is provided on the base material 13 so as to bridge the discontinuous portion 11D of the conductive pattern 11 in a state of insulation. Therefore, capacitors C21 and C22 that each are equivalent to a second capacitance component are generated between a vicinity of an end of the discontinuous portion 11D of the conductive pattern 11 and the conductive pattern 12. An adhesive layer 14 is provided on a surface of the base material 13 on which the conductive pattern 11 is provided.

Figure 8A:
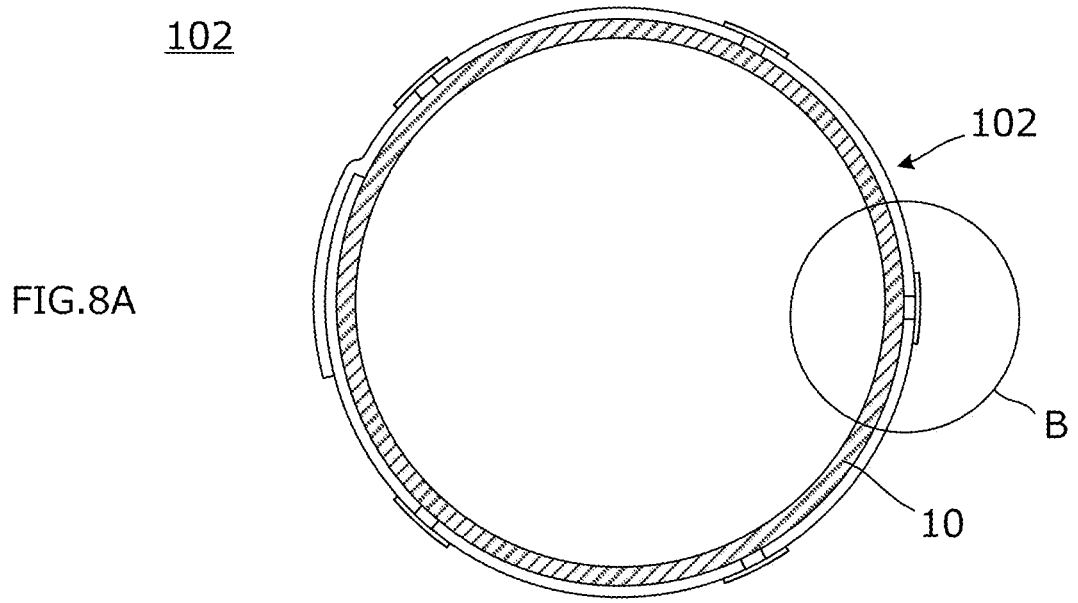
FIG. 8A is a horizontal cross-sectional view of the article 10 and the RFID auxiliary antenna device 102 attached to the article 10.
Figure 8B:
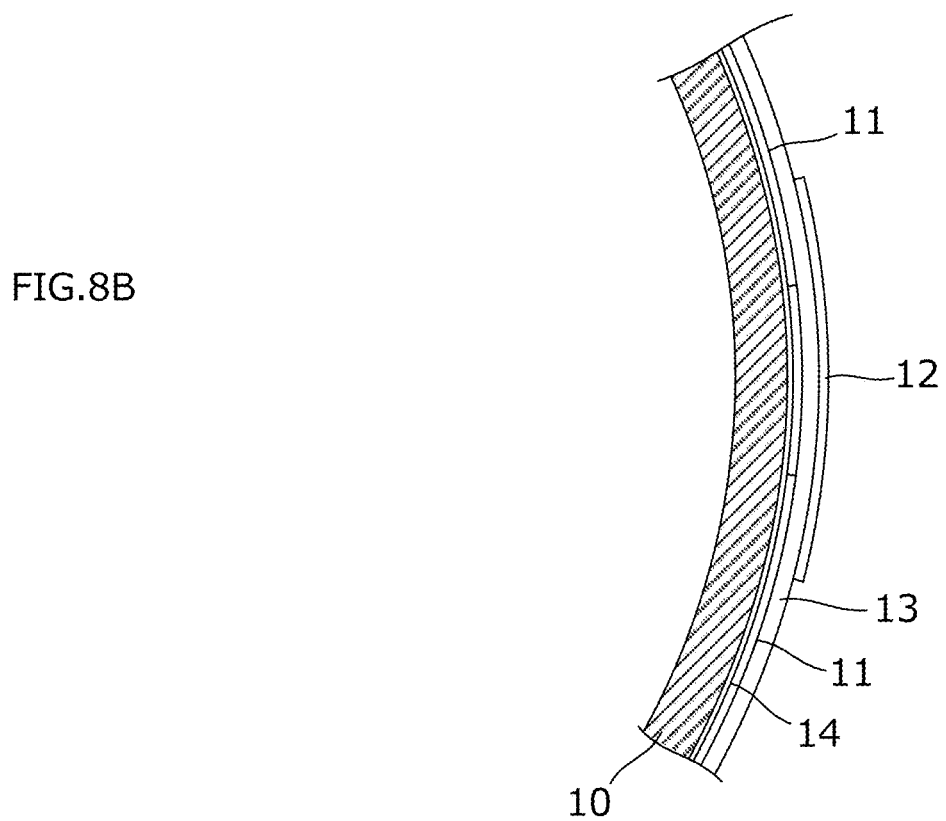
FIG. 8B is an enlarged cross-sectional view of a portion surrounded by a circle B in FIG. 8A.

FIG. 8A is a horizontal cross-sectional view of the article 10 and the RFID auxiliary antenna device 102 attached to the article 10. FIG. 8B is an enlarged cross-sectional view of a portion surrounded by a circle B in FIG. 8A. The RFID auxiliary antenna device 102 is adhered on the outer side surface of the article 10 through the adhesive layer 14 so as to circle the outer side surface of the article 10. A first end and a second end of the stripline-like conductive pattern 11 overlap with each other. A capacitor C1 that is equivalent to a first capacitance component is generated between conductive patterns 11 that face each other in a stacking direction through the base material 13.

In addition, the conductive pattern 11 includes a plurality of discontinuous portions 11D, and the conductive pattern 12 to bridge each of these discontinuous portions 11D in the state of insulation is provided, as shown in FIG. 7B, for example. Each of the capacitors C21 and C22 that is equivalent to the second capacitance component is generated between the conductive pattern 11 and the conductive pattern 12 that face in the stacking direction through the base material 13.

While FIG. 8A illustrates the RFID auxiliary antenna device 102 including a plurality of conductive patterns 12, an RFID auxiliary antenna device including a single conductive pattern 12 can also be configured according to an exemplary aspect.

Figure 9:
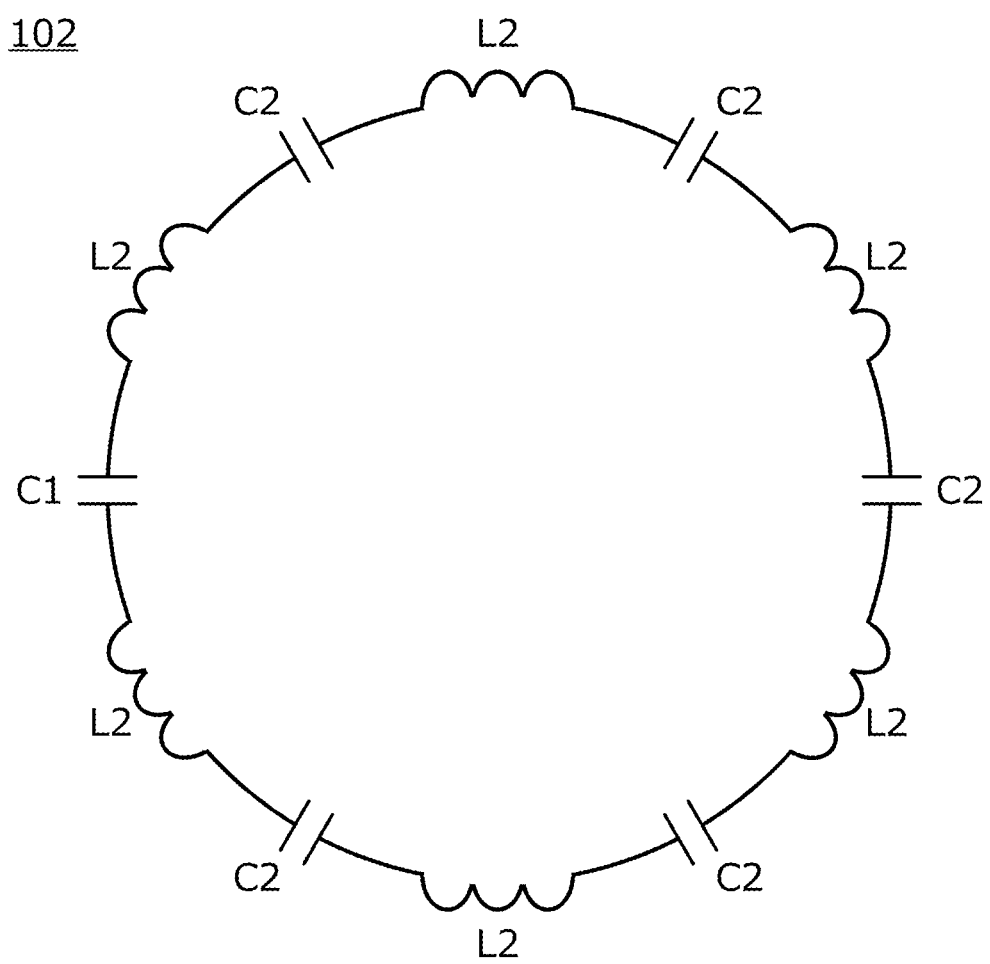
FIG. 9 is an equivalent circuit diagram of the RFID auxiliary antenna device 102.

FIG. 9 is an equivalent circuit diagram of the RFID auxiliary antenna device 102. As with the example described in the first exemplary embodiment, in FIG. 9, the capacitor C1 is equivalent to the first capacitance component generated between the first end and second end of the conductive pattern 11. An inductor L2 is equivalent to an inductance component of each conductive pattern 11 separated by the discontinuous portion 11D. The capacitor C2 is equivalent to the second capacitance component, and is a combined capacitance of the capacitors C21 and C22 that each are equivalent to the second capacitance component generated between the vicinity of the end of the discontinuous portion 11D of the conductive pattern 11 and the conductive pattern 12. The capacitance of the capacitor C1 is 2 pF, for example, the capacitance of the capacitor C2 is 20 pF, for example, and the inductance of the inductor L2 is 16 nH, for example.

Moreover, in this exemplary aspect, the capacitance of the capacitor C2 is sufficiently smaller than the capacitance of the capacitor C1. The capacitor C1 provided at the end of winding of the RFID auxiliary antenna device 102 is affected by winding deviation to the article 10, a thickness of the adhesive layer 14, or the like, so that the capacitance tends to vary and affects variation of the resonant frequency. On the other hand, a factor of variation in the capacitor C2 provided as a sheet includes an electrode width and a base material thickness when the sheet is provided, and the variation in the capacitor C2 is generally able to be kept smaller than the variation in the capacitor C1. The capacitance component of the resonant circuit is a combined capacitance component of a series circuit of the capacitor C1 and the capacitor C2. As described above, when C1>>C2 (i.e., C1 is larger than C2), the effect of the variation in C1 on the capacitance component of the resonant circuit is reduced.

The inductor L2, the capacitor C2 of the second capacitance component, and the capacitor C1 of the first capacitance component that are shown in FIG. 9 configure the LC resonant circuit. The resonant frequency of the resonant circuit is equal to the communication frequency of the RFID tag 21, or is substantially equal to the communication frequency. For example, when the RFID tag is a RFID tag in a 900-MHz band, the resonant circuit resonates in the 900-MHz band. As with the RFID auxiliary antenna device 101 described in the first exemplary embodiment, the conductive pattern 11 does not only simply use the inductance, but forms a circular loop shape by circling along the outer perimeter of the article 10.

In addition, a combination of one inductor L2 and one capacitor C2 connected to the inductor that are shown in FIG. 9 configures a unit resonant circuit. In short, a plurality of unit resonant circuits connected in series configure one loop. As a result, inductance accumulation (simple addition of inductance of a plurality of inductors (inductors L shown in FIG. 4)) is avoided, and voltages at both ends of the unit resonant circuit at resonance are real numbers, so that no phase is accumulated around the loop, and currents around the loop are substantially in phase. In other words, the currents remain constant along the loop, and a magnetic field aligned along the axis of the loop is generated.

According to the above configuration and function, even when the size of the loop is small, the magnetic field similar to a simple LC resonant circuit with a loop and a capacitor as in the example shown in FIG. 4 can be generated.

Figure 10:
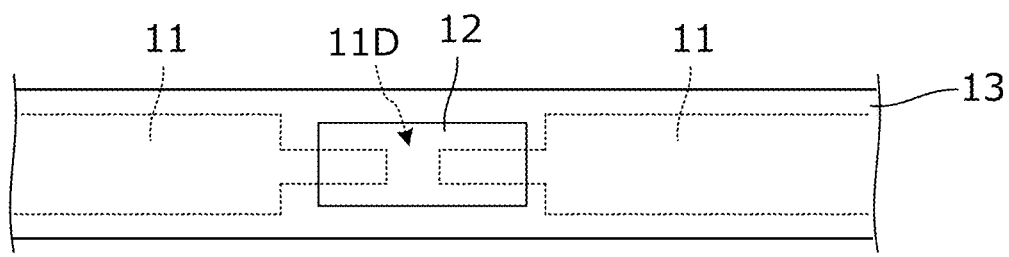
FIG. 10 is a partial plan view of another auxiliary antenna device according to the second exemplary embodiment.

FIG. 10 is a partial plan view of another RFID auxiliary antenna device according to the second exemplary embodiment. This RFID auxiliary antenna device includes a conductive pattern 11 made of metal foil adhered to a bottom surface of the base material 13 of insulation, and a conductive pattern 12 made of metal foil adhered to a top surface of the base material 13. A portion of the conductive pattern 11 that faces the conductive pattern 12 is smaller than a width of the conductive pattern 12. Therefore, even when positions at which the conductive pattern 11 and the conductive pattern 12 are provided in a width direction are misaligned, the total facing area of the vicinity of the end of the discontinuous portion 11D of the conductive pattern 11 and the conductive pattern 12 is kept constant. In addition, even when positions at which the conductive pattern 11 and the conductive pattern 12 are provided in a longitudinal direction are misaligned, the total facing area of the vicinity of the end of the discontinuous portion 11D of the conductive pattern 11 and the conductive pattern 12 is kept constant. Therefore, the second capacitance component is hardly affected by the effect of misalignment of the positions at which the conductive pattern 11 and the conductive pattern 12 are provided.

Third Exemplary Embodiment

In a third exemplary embodiment, an RFID auxiliary antenna device in which the configuration of the second conductive pattern is different from the configuration in the example shown in the second preferred embodiment will be described.

Figure 11A:
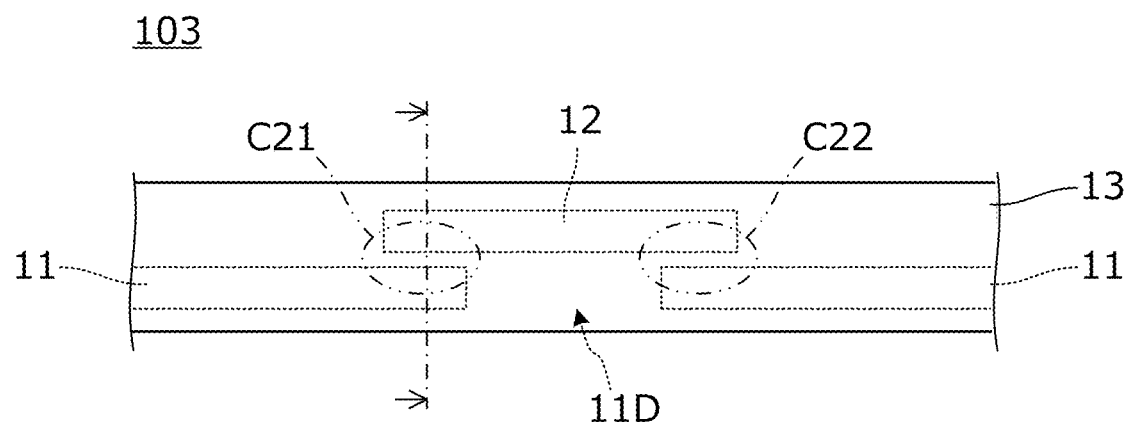
FIG. 11A is a partial plan view of an RFID auxiliary antenna device 103 according to a third exemplary embodiment.
Figure 11B:
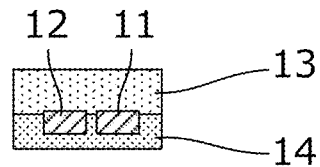
FIG. 11B is a cross-sectional view of a dashed line portion in FIG. 11A.

FIG. 11A is a partial plan view of an RFID auxiliary antenna device 103 according to the third exemplary embodiment, and FIG. 11B is a cross-sectional view of a dashed line portion in FIG. 11A. This RFID auxiliary antenna device 103 includes a conductive pattern 11 and a conductive pattern 12 that are made of metal foil adhered to a bottom surface of a base material 13 of insulation. The conductive pattern 11 includes a discontinuous portion 11D in an intermediate portion of the pattern. The conductive pattern 12 faces the end of the conductive pattern 11 separated by the discontinuous portion 11D in a plane direction of the base material 13. Therefore, capacitors C21 and C22 that each are equivalent to the second capacitance component are generated between the vicinity of the end of the discontinuous portion 11D of the conductive pattern 11 and the conductive pattern 12. Moreover, an adhesive layer 14 is provided on a surface of the base material 13 on which the conductive pattern 11 is provided.

In this manner, the conductive pattern 11 and the conductive pattern 12 can be provided on the same layer. According to the present exemplary embodiment, the conductive pattern 11 and the conductive pattern 12 are provided simultaneously, so that a change in characteristics due to printing misalignment is significantly reduced.

Fourth Exemplary Embodiment

In a fourth exemplary embodiment, an RFID auxiliary antenna device that does not include a base material on which a conductive pattern is provided will be described.

Figure 12:
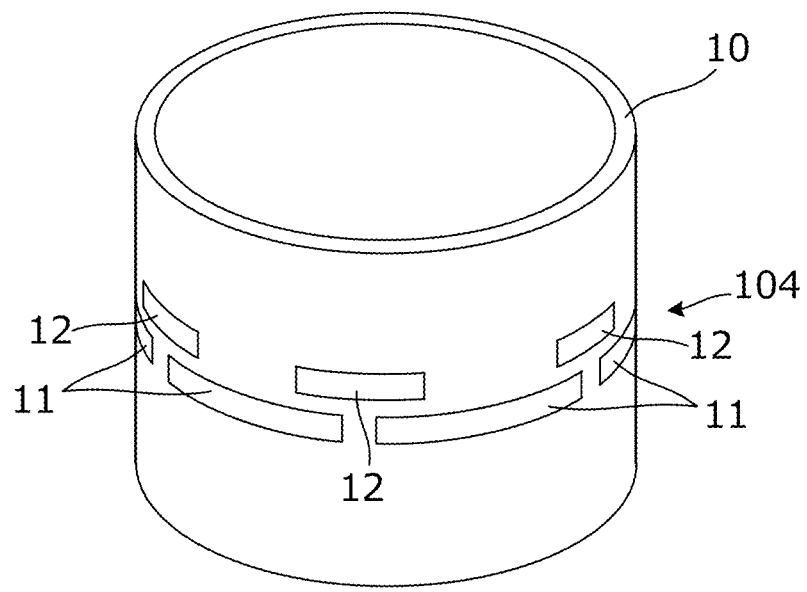
FIG. 12 is a perspective view of the article 10 including an RFID auxiliary antenna device 104 according to a fourth exemplary embodiment.
Figure 13:
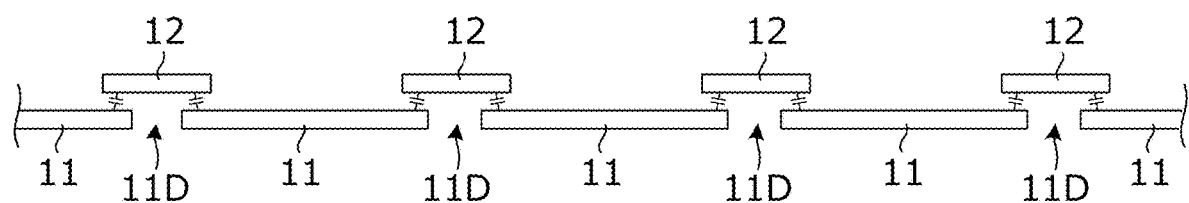
FIG. 13 is a partial development view of the RFID auxiliary antenna device 104.

FIG. 12 is a perspective view of the article 10 including an RFID auxiliary antenna device 104 according to the fourth exemplary embodiment. FIG. 13 is a partial development view of the RFID auxiliary antenna device 104.

In this exemplary aspect, the article 10 is a container that accommodates an RFID tag, and is a molded body of insulating resin, for example. A plurality of conductive patterns 11 and 12 are provided on the outer side surface of the article 10. The conductive pattern 11 is a stripline-like pattern, and includes a discontinuous portion 11D in an intermediate portion of the pattern. The conductive pattern 12 is provided along the discontinuous portion 11D of the conductive pattern 11. Therefore, a capacitance component is generated between a vicinity of an end of the discontinuous portion 11D of the conductive pattern 11, and the conductive pattern 12.

Figure 14:
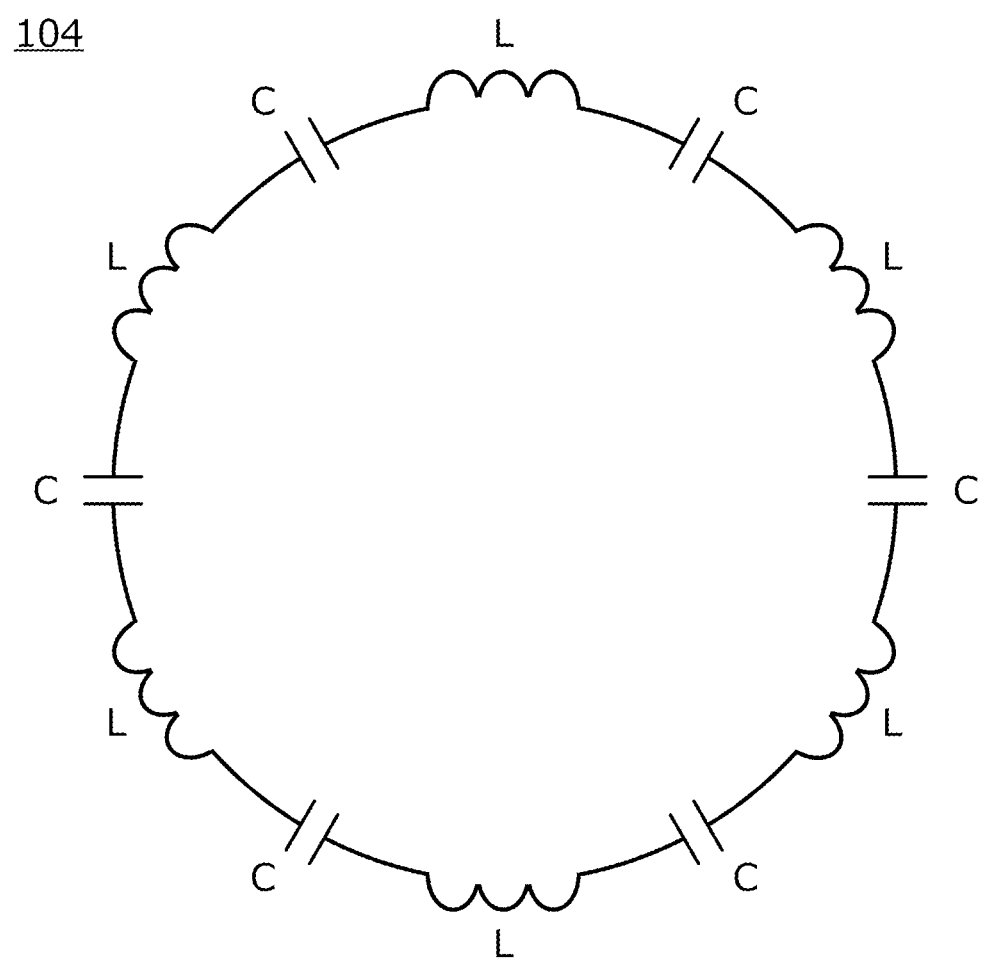
FIG. 14 is an equivalent circuit diagram of the RFID auxiliary antenna device 104.

FIG. 14 is an equivalent circuit diagram of the RFID auxiliary antenna device 104. In FIG. 14, a capacitor C is equivalent to the capacitance component generated between the conductive pattern 11 and the conductive pattern 12. An inductor L is equivalent to an inductance component of each conductive pattern 11 separated by the discontinuous portion 11D.

As shown, a plurality of inductors L and a plurality of capacitors C that are shown in FIG. 14 configure an LC resonant circuit. The resonant frequency of the resonant circuit is equal to the communication frequency of the RFID tag 21, or is substantially equal to the communication frequency. The conductive pattern 11 not only simply uses the inductance, but also forms a circular loop shape by circling along the outer perimeter of the article 10.

As shown in the present exemplary embodiment, the conductive pattern may be directly provided on the surface of the article.

Fifth Exemplary Embodiment

In a fifth exemplary embodiment, an RFID auxiliary antenna device including a conductive pattern that is directly provided on a surface of an article, a first capacitance component, and a second capacitance component will be described.

Figure 15:
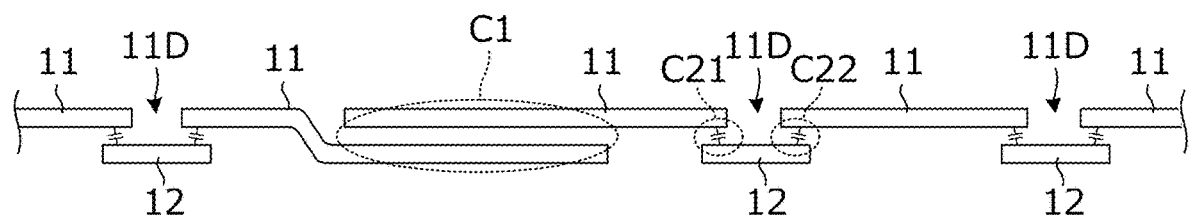
FIG. 15 is a partial development view of an RFID auxiliary antenna device 105 according to a fifth exemplary embodiment.

FIG. 15 is a partial development view of an RFID auxiliary antenna device 105 according to the fifth exemplary embodiment. This RFID auxiliary antenna device 105 is directly provided on the surface of the article 10 as in the example shown in FIG. 12. A plurality of conductive patterns 11 and 12 are provided on the outer side surface of the article 10. The conductive pattern 11 is a stripline-like pattern, and includes a discontinuous portion 11D in an intermediate portion of the pattern. The conductive pattern 12 is provided along the discontinuous portion 11D of the conductive pattern 11. In short, the conductive pattern 12 faces the discontinuous portion 11D of the conductive pattern 11 along the surface of the article. Therefore, capacitors C21 and C22 that each are equivalent to a second capacitance component are generated between the vicinity of the end of the discontinuous portion 11D of the conductive pattern 11 and the conductive pattern 12. In addition, the vicinity of a first end and the vicinity of a second end, in a circling direction in which the plurality of conductive patterns 11 circle, are parallel in the circling direction. A capacitor C1 equivalent to a first capacitance component is generated in this portion.

The equivalent circuit diagram of the RFID auxiliary antenna device 105 according to the fifth exemplary embodiment is as shown in FIG. 9 in the second exemplary embodiment.

As shown in the present exemplary embodiment, a conductive pattern can be directly provided on the surface of the article to provide the first capacitance component and the second capacitance component.

Finally, it is noted generally that the present disclosure is not limited to the foregoing exemplary embodiments. Various modifications or changes can be appropriately made by those skilled in the art.

For example, while FIG. 7A and FIG. 7B show an example in which the conductive patterns 11 and 12 are provided on two layers of the base material 13, the conductive pattern 11 or 12 can be provided on a plurality of layers such as three or more layers of the base material 13, and the second capacitance component can be provided in a space between conductive patterns in the thickness direction of the base material 13.

In addition, the end of the conductive pattern 11 and the end of the conductive pattern 11, by being butted with a predetermined space from each other, can provide the first capacitance component in the space. Similarly, the end of the conductive pattern 11 divided by the discontinuous portion and the end of the conductive pattern 11, by being butted with a predetermined space from each other, can provide the second capacitance component in the space.

REFERENCE SIGNS LIST

C—capacitor (capacitance component)
C1—capacitor (first capacitance component)
C2, C21, C22—capacitor (second capacitance component)
L, L2—inductor (inductance component)
10—article
11, 12—conductive pattern
11D—discontinuous portion
13—base material
14—adhesive layer
20—RFID tagged article
21, 21A, 21B—RFID tag
30—antenna substrate
31—reader/writer antenna
101, 102, 103, 104, 105—RFID auxiliary antenna device
301—reader/writer

The invention claimed is:

1. An RFID auxiliary antenna device configured to be disposed on an article that accommodates an RFID tag or communicates with the RFID tag, the RFID auxiliary antenna device comprising:
   a conductive pattern that is configured to extend around a periphery of the article; and
   a resonant circuit configured by a capacitance component generated between portions of the conductive pattern that face each other and an inductance component of the conductive pattern,
   wherein the resonant circuit comprises a resonant frequency that corresponds to a communication frequency of the RFID tag,
   wherein the conductive pattern circles the periphery of the article,
   wherein the capacitance component includes a first capacitance component and a second capacitance component,
   wherein the first capacitance component is a capacitance component generated between vicinities of ends in a circling direction in which the conductive pattern circles,
   wherein the conductive pattern is elongated in the circling direction, and includes a discontinuous portion in the circling direction, and
   wherein the second capacitance component is a capacitance component generated between respective conductive patterns of the discontinuous portion.

2. The RFID auxiliary antenna device according to claim 1, wherein the conductive pattern is configured to extend around an outer side surface of the periphery of the article.

3. The RFID auxiliary antenna device according to claim 1, wherein the resonant frequency of the resonant circuit is equal to or substantially equal to the communication frequency of the RFID tag.

4. The RFID auxiliary antenna device according to claim 1,
   wherein the conductive pattern is provided on a base material having a sheet-like shape, and
   wherein the first capacitance component is provided between respective conductive patterns that interpose the base material.

5. The RFID auxiliary antenna device according to claim 4, wherein the conductive pattern is a stripline-like pattern having a width in a direction perpendicular to a direction of the stripline-like pattern that is smaller than a corresponding width of the base material.

6. The RFID auxiliary antenna device according to claim 4,
   wherein the conductive pattern is provided in a plurality of layers of the base material, and
   wherein the second capacitance component is generated in a space between the respective conductive patterns that is provided in a thickness direction of the base material.

7. The RFID auxiliary antenna device according to claim 4, wherein the second capacitance component is generated in a space between the conductive patterns that is provided in a plane direction of the base material.

8. The RFID auxiliary antenna device according to claim 1,
   wherein the conductive pattern is provided on a surface of the periphery of the article, and
   wherein the capacitance component is generated in a space between the portions of the conductive pattern that face each other along the surface of the article.

9. The RFID auxiliary antenna device according to claim 1,
   wherein the conductive pattern is provided on a surface of the article, and
   wherein the first capacitance component and the second capacitance component are generated in a space between the portions of the conductive pattern that face each other along the surface of the article.

10. The RFID auxiliary antenna device according to claim 1, wherein the conductive pattern is magnetically coupled to the RFID tag.

11. An RFID auxiliary antenna device configured to be disposed on an article that accommodates an RFID tag or communicates with the RFID tag, the RFID auxiliary antenna device comprising:
    at least one conductive pattern that is configured to extend around a periphery of the article; and
    a resonant circuit configured by a capacitance component generated between respective portions of the at least one conductive pattern that face each other and an inductance component of the at least one conductive pattern,
    wherein the at least one conductive pattern comprises a pair of conductive patterns that collectively circle the periphery of the article,
    wherein the capacitance component includes a first capacitance component and a second capacitance component,
    wherein the first capacitance component is a capacitance component generated between vicinities of ends in a circling direction in which the pair of conductive patterns circles,
    wherein at least one of the pair of conductive patterns is elongated in the circling direction and includes a discontinuous portion in the circling direction, and
    wherein the second capacitance component is a capacitance component generated between the pair of patterns.

12. The RFID auxiliary antenna device according to claim 11, wherein the resonant circuit comprises a resonant frequency that corresponds to a communication frequency of the RFID tag.

13. The RFID auxiliary antenna device according to claim 11,
wherein the pair of conductive patterns are provided on a base material having a sheet-like shape, and
wherein the first capacitance component is provided between the pair of conductive patterns that interpose the base material.

14. The RFID auxiliary antenna device according to claim 13, wherein at least one of the pair of conductive patterns is a stripline-like pattern having a width in a direction perpendicular to a direction of the stripline-like pattern that is smaller than a corresponding width of the base material.

15. The RFID auxiliary antenna device according to claim 13,
wherein the pair of conductive patterns is provided in a plurality of layers of the base material, respectively, and
wherein the second capacitance component is generated in a space between the pair of conductive patterns that is provided in a thickness direction of the base material.

* * * * *